United States Patent
Nowaczyk et al.

(10) Patent No.: US 9,222,539 B1
(45) Date of Patent: Dec. 29, 2015

(54) SHOCK ABSORBER WITH FREQUENCY DEPENDENT PASSIVE VALVE

(71) Applicant: Tenneco Automotive Operating Company Inc., Lake Forest, IL (US)

(72) Inventors: Mark Nowaczyk, Heers (BE); Jan Vochten, St. Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 19 days.

(21) Appl. No.: 14/459,589

(22) Filed: Aug. 14, 2014

(51) Int. Cl.
*F16F 9/512* (2006.01)
*F16F 9/348* (2006.01)

(52) U.S. Cl.
CPC ............... *F16F 9/512* (2013.01); *F16F 9/348* (2013.01); *F16F 9/3488* (2013.01)

(58) Field of Classification Search
CPC ......... F16F 9/512; F16F 9/348; F16F 9/3488; F16F 9/504; F16F 9/5126
USPC ............................................ 188/280, 322.13
See application file for complete search history.

(56) References Cited

U.S. PATENT DOCUMENTS

| | | | |
|---|---|---|---|
| 5,129,488 A | 7/1992 | Furuya et al. | |
| 5,139,119 A | 8/1992 | Karnopp | |
| 5,248,014 A | 9/1993 | Ashiba | |
| 5,386,892 A * | 2/1995 | Ashiba | F16F 9/516 188/280 |
| 5,423,402 A | 6/1995 | de Kock | |
| 5,467,852 A | 11/1995 | de Kock | |
| 6,334,516 B1 | 1/2002 | Shirley et al. | |
| 6,668,986 B2 | 12/2003 | Moradmand et al. | |
| 2005/0029063 A1 * | 2/2005 | Neumann | F16F 9/46 188/322.13 |
| 2005/0045440 A1 | 3/2005 | Kock et al. | |
| 2006/0283675 A1 | 12/2006 | Teraoka et al. | |
| 2010/0078275 A1 * | 4/2010 | Kazmirski | F16F 9/512 188/280 |
| 2013/0020158 A1 * | 1/2013 | Park | F16F 9/3405 188/280 |

FOREIGN PATENT DOCUMENTS

| | | | |
|---|---|---|---|
| DE | 4327358 | 10/1994 | |
| DE | 60210652 T2 | 8/2006 | |
| EP | 1442227 | 8/2004 | |
| JP | 07-174183 | 7/1995 | |
| JP | 07-217696 | 8/1995 | |
| JP | 09151981 A * | 6/1997 | |
| JP | 2011-007213 | 1/2011 | |
| KR | 101426810 B1 * | 8/2014 | F16F 9/5126 |
| WO | 2011/120119 | 10/2011 | |
| WO | 2013/051934 | 4/2013 | |
| WO | 2014/104876 | 7/2014 | |

OTHER PUBLICATIONS

International Search Report and Written Opinion dated Sep. 21, 2015 in corresponding PCT Application No. PCT/US2015/038416 (9 pages).

* cited by examiner

*Primary Examiner* — Melanie Torres Williams
(74) *Attorney, Agent, or Firm* — Harness, Dickey & Pierce, P.L.C.

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a frequency dependent valve assembly attached to the piston rod which defines a housing attached to the piston rod and a spool valve assembly. The spool valve assembly includes a pair of spool valves and a pair of bypass valve assemblies that control fluid flow through a bypass passage that bypasses the piston assembly.

16 Claims, 5 Drawing Sheets

SHOCK ABSORBER WITH FREQUENCY DEPENDENT PASSIVE VALVE

FIELD OF THE INVENTION

The present disclosure relates to a hydraulic damper or shock absorber adapted for use in a suspension system such as the systems used for automotive vehicles. More particularly, the present disclosure relates to a hydraulic damper having a frequency dependent passive valving system that provides softer damping characteristics with high frequency road inputs in both rebound and compression strokes.

BACKGROUND OF THE INVENTION

A conventional prior art hydraulic damper or shock absorber comprises a cylinder defining a fluid chamber having a piston slidably disposed in the fluid chamber with the piston separating the interior of the cylinder into an upper and a lower working chamber. A piston rod is connected to the piston and extends out of one end of the cylinder. A first valving system is incorporated for generating damping force during the extension or rebound stroke of the hydraulic damper and a second valving system is incorporated for generating damping force during the compression stroke of the hydraulic damper.

Various types of damping force generating devices have been developed to generate desired damping forces in relation to the frequency of the inputs from the roads over which the vehicle travels. These frequency dependent selective damping devices provide the ability to have softer damping characteristics with higher frequency road inputs. These softer damping characteristics lead to a more effective isolation of the vehicle body from unwanted disturbances. Typically these frequency dependent damping devices operate only during a rebound (extension) movement or a compression movement of the hydraulic damper or shock absorber. Thus, there is a need for a frequency dependent selective damping device that provides the ability to have softer damping characteristics in both rebound and compression movements of the hydraulic damper or shock absorber in response to the higher frequency road inputs.

The continued development of hydraulic dampers includes the development of frequency dependent damping devices that function in both a rebound (extension) movement and a compression movement of the hydraulic damper or shock absorber.

SUMMARY OF THE INVENTION

The present disclosure provides the art with a frequency dependent hydraulic damper or shock absorber that provides soft damping in both rebound and compression strokes of the hydraulic damper or shock absorber. Soft damping is provided for the higher frequency road inputs in both the rebound (extension) stroke and the compression stroke of the hydraulic damper or shock absorber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
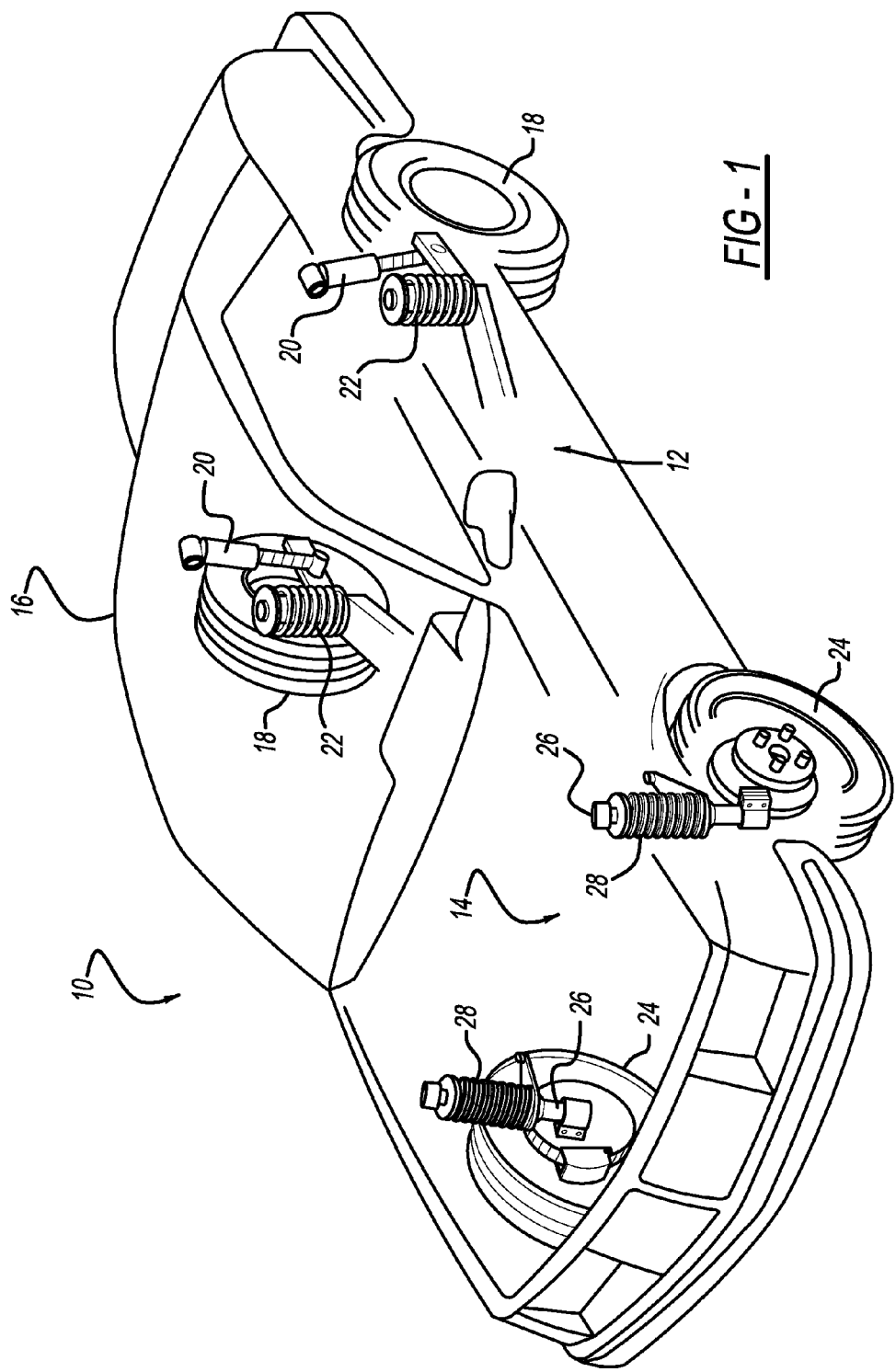
FIG. 1 is an illustration of an automobile using shock absorbers incorporating the frequency dependent damping device in accordance with the present disclosure.

Referring now to the drawings in which like reference numerals designate like or corresponding parts throughout the several views, there is shown in FIG. 1 a vehicle incorporating a suspension system having the frequency dependent shock absorbers in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
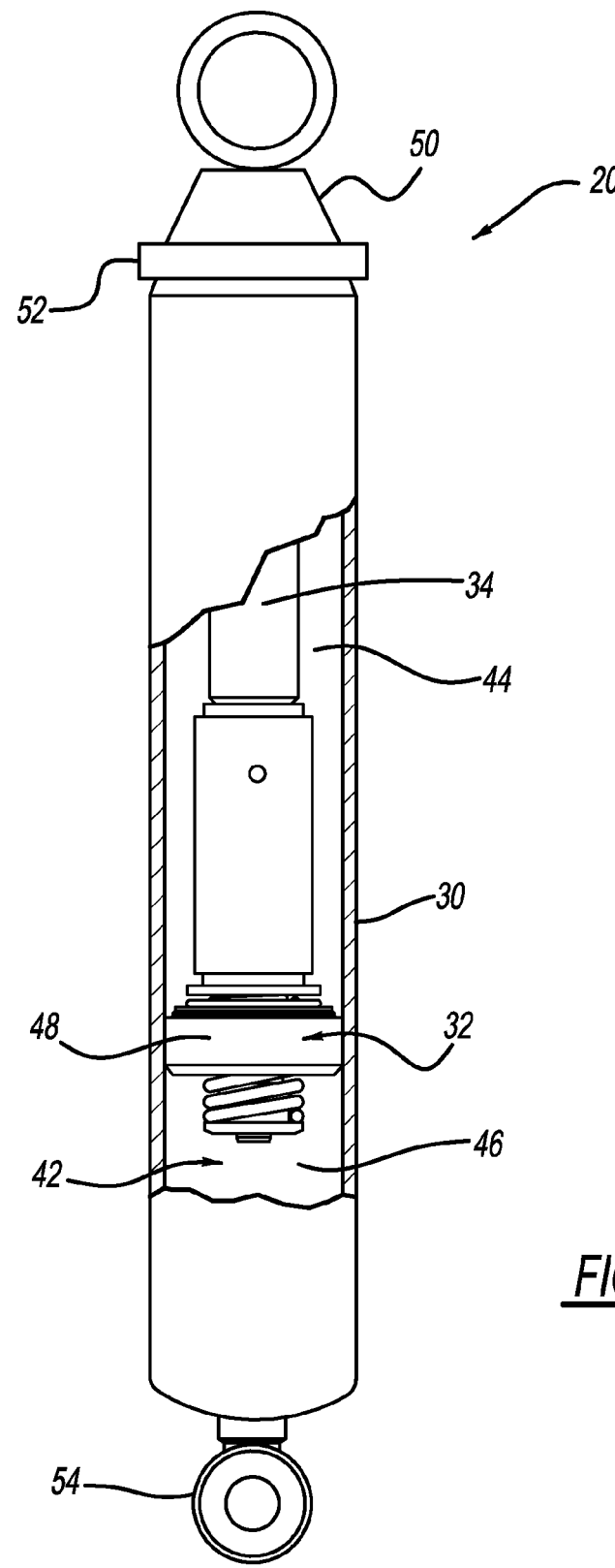
FIG. 2 is a cross-sectional side view of a monotube shock absorber incorporating the frequency dependent damping device in accordance with the present disclosure.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung or unsprung portion of vehicle 10. In the preferred embodiment, piston rod 34 is secured to body 16 or the sprung portion of vehicle 10. Pressure tube 30 is filled with fluid and it includes a fitting 54 for attachment to the sprung or unsprung portion of the vehicle. In the preferred embodiment fitting 54 is secured to the unsprung portion of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
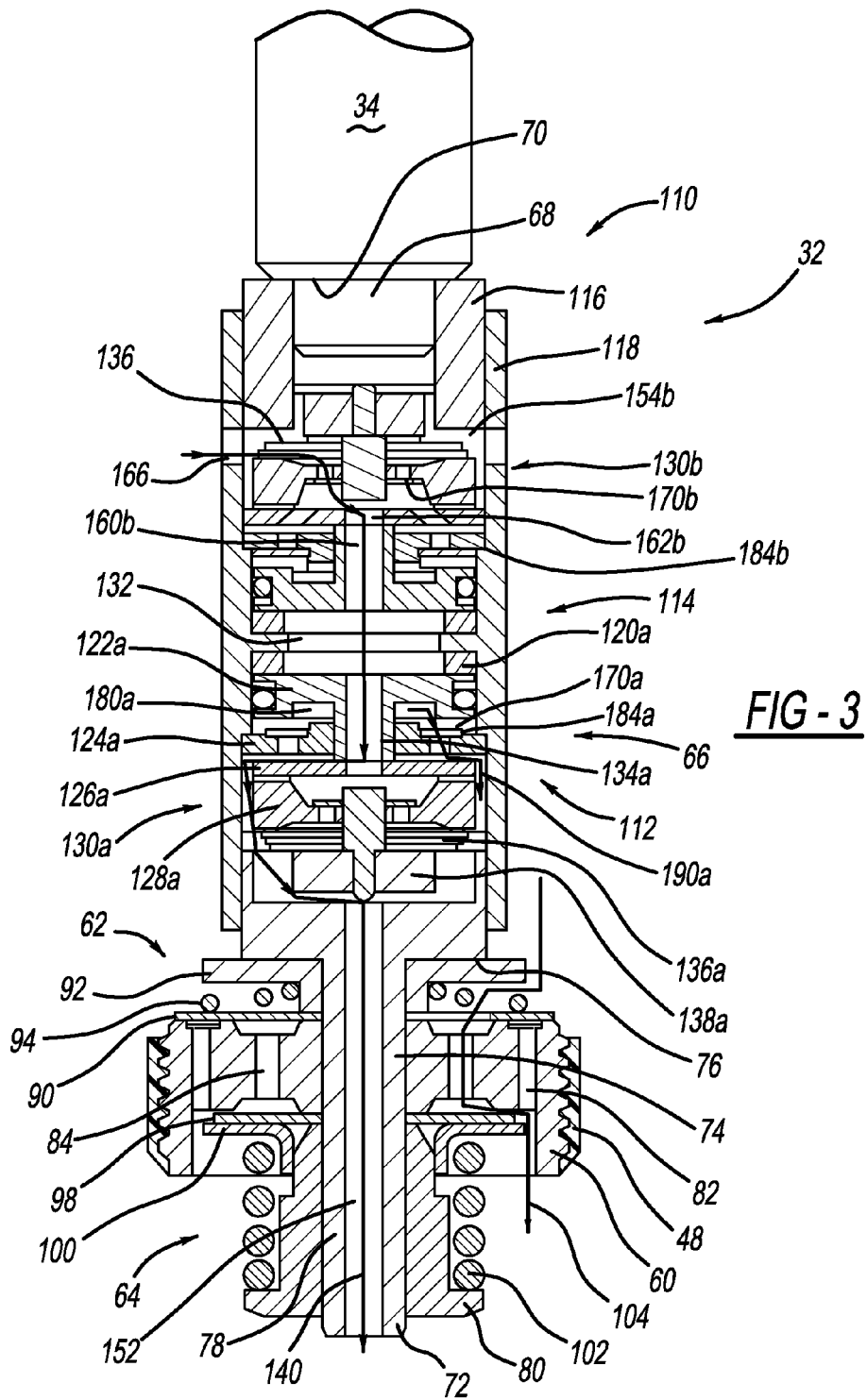
FIG. 3 is an enlarged cross-sectional side view illustrating the piston assembly of the shock absorber shown in FIG. 1 during an extension stroke of the shock absorber.
Figure 4:
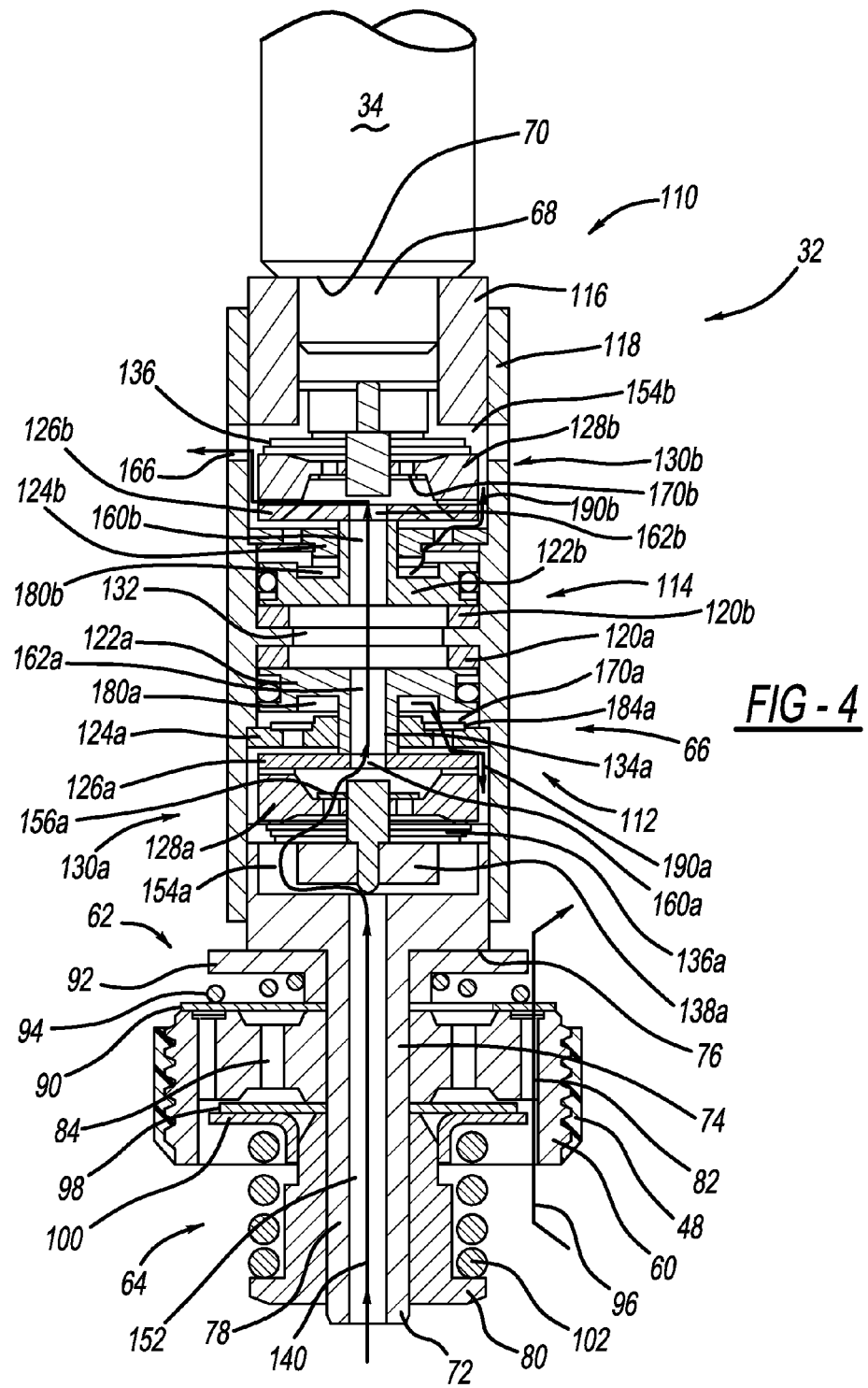
FIG. 4 is an enlarged cross-sectional side view illustrating the piston assembly of the shock absorber shown in FIG. 1 during a compression stroke of the shock absorber.

Referring now to FIGS. 3 and 4, piston assembly 32 is attached to piston rod 34 and comprises a piston body 60, a compression valve assembly 62, an extension or rebound valve assembly 64 and a frequency dependent valve assembly 66. Piston rod 34 includes a reduced diameter section 68 located on the end of piston rod 34 disposed within pressure tube 30 to form a shoulder 70 for mounting the components of piston assembly 32. Frequency dependent valve assembly 66 is located on reduced diameter section 68. The opposite end of frequency dependent valve assembly 66 is attached to a piston post 72. Piston post 72 includes a reduced diameter section 74 to form a shoulder 76 for mounting piston body 60, compression valve assembly 62 and rebound valve assembly 64. Piston body 60 is located on reduced diameter section 74 with compression valve assembly 62 being located between piston body 60 and shoulder 76 and with rebound valve assembly 64 being located between piston body 60 and a threaded end 78 of piston post 72. A retaining nut 80 is threadingly or slidingly received on threaded end 78 or reduced diameter section 74 of piston post 72 to secure piston body 60, compression valve assembly 62 and extension or rebound valve assembly 64 to piston post 72. Piston body 60 defines a plurality of compression flow passages 82 and a plurality of rebound flow passages 84.

Compression valve assembly 62 comprises a compression valve plate 90, a valve stop 92 and a spring 94. Valve plate 90 is disposed adjacent to piston body 60 to cover the plurality of compression flow passages 82. Valve stop 92 is disposed adjacent shoulder 76 and spring 94 is disposed between valve plate 90 and valve stop 92 to bias valve plate 90 against piston body 60. During a compression stroke of shock absorber 20, fluid pressure builds up in lower working chamber 46 until the fluid pressure applied to valve plate 90 through compression flow passages 82 overcomes the load provided by spring 94. Valve plate 90 will move away from piston body 60 and compress spring 94 to open compression flow passages 82 to allow fluid to flow from lower working chamber 46 to upper working chamber 44 as shown by arrow 96 in FIG. 4.

Rebound valve assembly 64 comprises one or more valve plates 98, a spring seat 100 and a spring 102. Valve plates 98 are disposed adjacent to piston body 60 to cover the plurality of rebound flow passages 84. Spring seat 100 is disposed immediately adjacent valve plates 98. Spring 102 is disposed between spring seat 100 and retaining nut 80 to bias spring seat 100 against valve plates 98 and valve plates 98 against piston body 60. Retaining nut 80 is threaded onto threaded end 78 of piston post 72 to retain valve plates 98 against piston body 60 to close rebound flow passages 84 using spring 102 and spring seat 100. During an extension stroke of shock absorber 20, fluid pressure builds up in upper working chamber 44 until the fluid pressure applied to valve plates 98 through rebound flow passages 84 overcomes the load provided by spring 102. Valve plates 98 will move away from piston body 60 and compress spring 102 to open rebound flow passages 84 to allow fluid to flow from upper working chamber 44 to lower working chamber 46 as shown by arrows 104 in FIG. 3.

Referring now to FIGS. 3 and 4, frequency dependent valve assembly 66 is illustrated. Frequency dependent valve assembly 66 comprises a housing assembly 110, a rebound spool valve assembly 112 and a compression spool valve assembly 114. Housing assembly 110 includes an upper housing 116 and a lower housing 118. Upper housing 116 is threadingly or otherwise attached to the end of the piston rod 34. Lower housing 118 is threadingly or otherwise attached to upper housing 116 at one end and threadingly or otherwise attached to piston post 72 at the opposite end.

Rebound spool valve assembly 112 functions during a rebound stroke and includes and end stop 120a, a spool valve 122a, a valve body 124a, a valve seat plate 126a, an interface 128a and a disc pack 130a. Spool valve 122a is disposed within a cavity 132 defined by housing assembly 110. Spool valve 122a is slidingly disposed within both valve body 124a and housing assembly 110.

Valve body 124a is fixedly secured to housing assembly 110 by welding or by other means known in the art. Valve seat plate 126a is disposed adjacent valve body 124a such that a shaft 134a of spool valve 122a that extends through valve body 124a can contact valve seat plate 126a. Interface 128a is located on the side of valve seat plate 126a opposite to spool valve 122a. Disc pack 130a includes one or more discs 136a directly contacting interface 128a and a disc housing 138a to which the one or more discs 136a are attached using a retainer.

Referring now to FIG. 4, compression spool valve assembly 114a is the same as rebound spool valve assembly 112 except that it is rotated 180° in relation to rebound spool valve assembly 112 such that it functions during a compression stroke. Compression spool valve assembly 114 includes an end stop 120b, a spool valve 122b, a valve body 124b, a valve seat plate 126b, an interface 128b and a disc pack 130b. Spool valve 122b is disposed within cavity 132 defined by housing assembly 110. Spool valve 122b is slidingly disposed within both valve body 124b and housing assembly 110.

Valve body 124b is fixedly secured to housing assembly 110 by welding or by other means known in the art. Valve seat plate 126b is disposed adjacent valve body 124b such that a shaft 134b of spool valve 122b that extends through valve body 124b can contact valve seat plate 126b. Interface 128b is located on the side of valve seat plate 126b opposite to spool valve 122b. Disc pack 130b includes one or more discs 136b directly contacting interface 128b and a disc housing 138b to which the one or more discs 136b are attached using a retainer.

FIG. 4 illustrates fluid flow during a compression stroke of shock absorber 20. During a compression stroke, fluid pressure in lower working chamber 46 and in compression flow passage 82 increases. The fluid pressure in compression flow passage 82 will increase until the biasing load on valve plate 90 increases to the point that spring 94 is compressed and valve plate 90 is lifted entirely off of piston body 60 to fully open compression flow passages 82 as illustrated by arrow 96. Compression valve assembly 62 is a passive valve assembly with a firm damping characteristic.

At the beginning of the compression stroke prior to the opening of compression valve assembly 62, fluid may flow through a bypass fluid flow path indicated by arrow 140 which bypasses piston body 60, compression valve assembly 62 and rebound valve assembly 64. Flow path 140 extends from lower working chamber 46 through an axial passage 152 in piston post 72 and into a bypass chamber 154a defined by housing assembly 110 and rebound spool valve assembly 112. Flow path 140 proceeds around or through disc pack 130a, through a check valve 156a and into an axial passage 160a in valve seat plate 126a and an axial passage 162a in spool valve 122a into cavity 132 defined by housing assembly 110 between compression spool valve assembly 114 and rebound spool valve assembly 112.

Flow path 140 proceeds through an axial passage 160b in valve spool valve 122b and an axial passage 162b in valve seat plate 126b, around or through disc pack 130b and through a radial port 166 extending through housing assembly 110 into upper working chamber 44.

In the rest position, both spool valves 122a and 122b are in contact with their respective end stop 120a and 120b and each end stop 120a and 120b is in contact with housing assembly 110. Each shaft 134a and 134b of spool valves 122a and 122b is in contact with its respective valve seat plate 126a and 126b which is in contact with its respective interface 128a and 128b. Each disc pack 130a and 130b works as a spring and preloads its respective interface 128a and 128b against its respective seat plate 126a and 126b. In this position, a check valve 170a and 170b of each valve body 124a and 124b is closed.

During the compression movement, flow path 140 will enter frequency dependent valve assembly 66 through axial passage 152 in piston post 72 and enter chamber 154a. Fluid flow 140 will proceed through or around disc pack 130a, through check valve 156a, through axial passages 160a and 162a and into cavity 132. This fluid flow will pressurize cavity 132 resulting in a working force being exerted on spool valve 122b in the direction of valve seal plate 126b. Check valve 170b on valve body 124b will stay closed and the fluid within a chamber 180b on the opposite side of spool valve 122b will be forced away through a tunable orifice 184b which is located between check valve 170b and valve body 124b. This is illustrated using arrow 190b.

During a low frequency compression movement there is time enough to press away the fluid in chamber 180b between spool valve 122b and valve body 124b so spool valve 122b is able to move such that the preload between valve seat plate 126b and interface 128b will be increased due to the movement of valve seat plate 126b and interface 128b by shaft 134b of spool valve 122b. The preload will be increased such that the load working at the same time between valve seat plate 126b and interface 128b due to fluid pressure from axial passage 160b and 162b is not able to separate interface 128b from valve seat plate 126b resulting in a closed valve. Thus, there will be no flow 140 from lower working chamber 46 to upper working chamber 44 because shaft 134b of spool valve 122b will remain seated on valve seat plate 126b. Thus, the low frequency damping characteristics will be the same as the original damping generated by compression valve assembly 62.

During a high frequency compression movement, there is not enough time to press away the fluid in chamber 180b between spool valve 122b and valve body 124b. In this scenario, shaft 134b of spool valve 122b is not able to move valve seat plate 126b and the preload between valve seat plate 126b and interface 128b will not be increased. At the same time, the fluid pressure flowing through axial passages 160b and 162b will work on interface 128b and this fluid pressure will be able to separate interface 128b from valve seat plate 126b resulting in fluid flow 140 from lower working chamber 46 to upper working chamber 44. This fluid flow will cause a dropping off of the compression damping.

FIG. 3 illustrates fluid flow during a rebound (extension) stroke of shock absorber 20. During the rebound (extension) movement, flow path 140 will enter frequency dependent valve assembly 66 through radial port 166 in housing assembly 110 and enter a chamber 154b. Fluid flow 140 will proceed past or through disc pack 130b, through a check valve 170b, through axial passages 162b and 160b and into cavity 132. This fluid flow will pressurize cavity 132 resulting in a working force being exerted on spool valve 122a in the direction of valve seal plate 126a. A check valve 170a on valve body 124a will stay closed and the fluid within a chamber 180a on the opposite side of spool valve 122a will be forced away through a tunable orifice 184a which is located between check valve 170a and valve body 124a. This is illustrated using arrow 190a.

During a low frequency compression movement there is time enough to press away the fluid in chamber 180a between spool valve 122a and valve body 124a so spool valve 122a is able to move such that the preload between valve seat plate 126a and interface 128a will be increased due to the movement of valve seat plate 126a and interface 128a by shaft 134a of spool valve 122a. The preload will be increased such that the load working at the same time between valve seat plate 126a and interface 128a due to fluid pressure from axial passage 162a and 160a is not able to separate interface 128a from valve seat plate 126a resulting in a closed valve. Thus, there will be no flow 140 from upper working chamber 44 to lower working chamber 46 because shaft 134a of spool valve 122a will remain seated on valve seat plate 126a. Thus, the low frequency damping characteristics will be the same as the original damping generated by rebound valve assembly 64.

During a high frequency compression movement, there is not enough time to press away the fluid in chamber 180a between spool valve 122a and valve body 124a. In this scenario, shaft 134a of spool valve 122a is not able to move valve seat plate 126a and the preload between valve seat plate 126a and interface 128a will not be increased. At the same time, the fluid pressure flowing through axial passages 162a and 160a will work on interface 128a and this fluid pressure will be able to separate interface 128a from valve seat plate 126a resulting in fluid flow 140 from upper working chamber 44 to lower working chamber 46. This fluid flow will cause a dropping off of the rebound damping.

Figure 5:
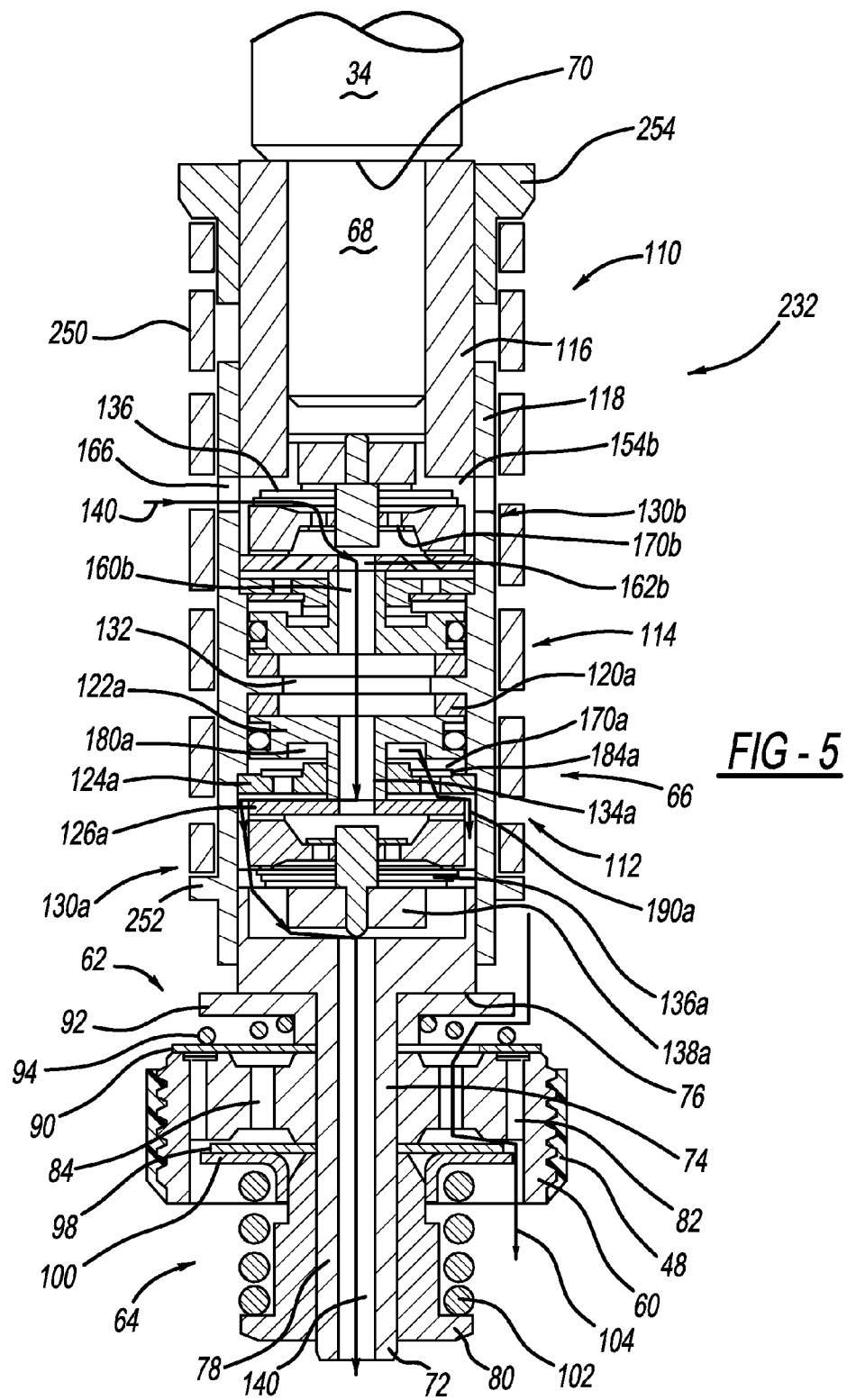
FIG. 5 is an enlarged cross-sectional view illustrating a frequency dependent valve assembly in accordance with another embodiment of the present disclosure.

Referring now to FIG. 5, a piston assembly 232 in accordance with another embodiment of the present disclosure is illustrated. Piston assembly 232 is the same as piston assembly 32 except for the addition of rebound spring 250. As illustrated in FIG. 5, lower housing 118 of housing assembly 110 is provided with a lower spring seat 252 which is a locally increased diameter which is a machined part of lower housing 118 or is a separate component secured to lower housing 118 by welding or by other means known in the art. Rebound spring 250 extends between lower spring seat 252 and an upper spring seat 254. Upper spring seat 254 is slidingly received on piston rod 34 and/or housing assembly 110 and operates to align rebound spring 250 with piston rod 34 and/or housing assembly 110. The combination of the use of frequency dependent valve assembly 66 and the use of rebound spring 250 allows the improvement of the comfort and rolling of the vehicle. The operation, function and fluid flow described above for frequency dependent valve assembly 66 associated with piston assembly 32 is the same for piston assembly 232.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
    a pressure tube defining a fluid chamber;
    a piston assembly disposed within said pressure tube, said piston assembly dividing said fluid chamber into an upper working chamber and a lower working chamber;
    a piston rod projecting out of said pressure tube, said piston assembly being attached to said piston rod;
    a frequency dependent valve assembly attached to said piston rod, said frequency dependent valve assembly comprising:
        a housing attached to said piston rod, said housing defining a fluid cavity;
        a first spool valve assembly disposed within said fluid cavity, said first spool valve assembly including a first spool valve and a first bypass valve assembly;
        a second spool valve assembly disposed within said fluid cavity, said second spool valve assembly including a second spool valve and a second bypass valve assembly; wherein
    movement of said first and second spool valve within said fluid cavity controls an amount of fluid pressure required to open said first and second bypass valve assembly, respectively.

2. The shock absorber according to claim 1, wherein said frequency dependent valve assembly controls fluid flow from said upper working chamber to said lower working chamber.

3. The shock absorber according to claim 2, wherein said frequency dependent valve assembly controls fluid flow from said lower working chamber to said upper working chamber.

4. The shock absorber according to claim 1, wherein said frequency dependent valve assembly controls fluid flow from said lower working chamber to said upper working chamber.

5. The shock absorber according to claim 1, wherein said housing is attached to a piston post which defines a fluid passage extending between said lower working chamber and said fluid cavity.

6. The shock absorber according to claim 1, wherein said first spool valve defines a fluid passage in direct fluid communication with said upper working chamber.

7. The shock absorber according to claim 5, wherein said second spool valve defines a fluid passage in direct fluid communication with said lower working chamber.

8. The shock absorber according to claim 1, wherein said second spool valve defines a fluid passage in direct fluid communication with said lower working chamber.

9. The shock absorber according to claim 1, wherein said first bypass valve assembly includes a first interface and a first valve seat plate, said frequency dependent valve assembly further comprising a first biasing member biasing said interface into engagement with said first valve seat plate, a first bypass chamber being defined by said first interface and said first valve seat plate.

10. The shock absorber according to claim 9, wherein said second bypass valve assembly includes a second interface and a second valve seat plate, said frequency dependent valve assembly further comprising a second biasing member biasing said interface into engagement with said second valve seat plate, a second bypass chamber being defined by said second interface and said second valve seat plate.

11. The shock absorber according to claim 10, wherein said second spool valve defines a second fluid passage in fluid communication with said second bypass chamber.

12. The shock absorber according to claim 10, wherein a fluid passage defined by said second spool valve is in direct communication with said lower working chamber.

13. The shock absorber according to claim 9, wherein said first spool valve defines a first fluid passage in fluid communication with said first bypass chamber.

14. The shock absorber according to claim 13, wherein said first fluid passage defined by said first spool valve is in direct communication with said upper working chamber.

15. The shock absorber according to claim 1, wherein said first spool valve defines a fluid passage in direct fluid communication with said first bypass valve assembly.

16. The shock absorber according to claim 15, wherein said second spool valve defines a fluid passage in direct fluid communication with said second bypass valve assembly.

* * * * *